United States Patent
Ogura et al.

(10) Patent No.: US 7,604,533 B2
(45) Date of Patent: Oct. 20, 2009

(54) REGISTER FOR AIR CONDITIONING

(75) Inventors: Mitsuo Ogura, Aichi-ken (JP); Kenji Asano, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 400 days.

(21) Appl. No.: 11/500,297

(22) Filed: Aug. 8, 2006

(65) Prior Publication Data

US 2007/0060040 A1    Mar. 15, 2007

(30) Foreign Application Priority Data

Sep. 14, 2005   (JP)   ............................. 2005-267142
Jun. 16, 2006   (JP)   ............................. 2006-167698

(51) Int. Cl.
*B60H 1/34*   (2006.01)
*B60H 1/00*   (2006.01)

(52) U.S. Cl. ......................... 454/155; 454/69; 454/143; 454/152

(58) Field of Classification Search .................. 454/69, 454/152, 153, 154, 155, 285, 143
See application file for complete search history.

(56) References Cited

U.S. PATENT DOCUMENTS 4,377,107 A * 3/1983 Izumi ......................... 454/316
5,080,002 A * 1/1992 Soethout et al. ............. 454/154
5,470,276 A * 11/1995 Burnell et al. .............. 454/155
6,340,328 B1 * 1/2002 Schwandt et al. ........... 454/155
6,347,987 B1 * 2/2002 Ichishi et al. ................. 454/75
6,652,371 B2 * 11/2003 Kamio ........................ 454/155
6,796,895 B2 * 9/2004 Demerath .................... 454/155
6,800,023 B2 * 10/2004 Demerath ................... 454/155

FOREIGN PATENT DOCUMENTS

| EP | 1457371 A1 * | 9/2004 |
| JP | 60169044 A * | 9/1985 |
| JP | Y2-2595402 | 3/1999 |
| JP | A-11-139156 | 5/1999 |
| JP | 2002293133 A * | 10/2002 |

* cited by examiner

*Primary Examiner*—Steven B McAllister
*Assistant Examiner*—Patrick F. O'Reilly, III
(74) *Attorney, Agent, or Firm*—Posz Law Group, PLC

(57) ABSTRACT

An air-conditioning register includes a cylinder-shaped retainer, a plurality of horizontal fins, a connecting rod, an actuating member, and a moving member. The cylinder-shaped retainer has opposite upper and lower walls and opposite side walls, which form an outlet opening and an air passage. The horizontal fins have a swing shaft, respectively, and are disposed pivotally about the swing shaft within the retainer. The connecting rod connects the horizontal fins. The actuating member actuates the connecting rod to swing the horizontal fins synchronously with each other. The moving member enables the swing shaft of at least one of the horizontal fins to move back and forth with respect to the retainer depending on a swing angle of the horizontal fins with respect to a horizontal plane.

7 Claims, 8 Drawing Sheets

(Prior Art)

REGISTER FOR AIR CONDITIONING

BACKGROUND OF THE INVENTION

The present invention relates to a register for air conditioning, register which is disposed in vehicle passenger rooms to make an opening for blowing out air-conditioning air thereinto. More particularly, it relates to an air-conditioning register whose downward directivity of blowing-out air is improved.

In an instrument panel, there is disposed a register, which works as an opening for blowing out warm or cold air sent out from an air conditioner. Japanese Utility Model Registration No. 2,595,402 discloses one of such registers, which have been known in general. For example, a conventional air-conditioning register comprises a cylinder-shaped retainer, a plurality of horizontal fins, a plurality of vertical fins, and air-blowing-direction varying means. The retainer forms an outlet opening, and air passage. The horizontal fins are disposed pivotally within the retainer, and additionally are parallel to each other. The vertical fins are disposed pivotally within the retainer, and additionally are parallel to each other. The air-blowing-direction varying means is a knob, for instance, and swings the horizontal fins and vertical fins to vary their angles with respect to the retainer so that the air-blowing direction is made variable. Thus, in the conventional air-conditioning register, the air-blowing-direction varying means is usually operated manually to adjust the angles of the horizontal fins and vertical fins with respect to the retainer so that it is possible to control the air-blowing direction of air-conditioning air.

For example, the horizontal fins are supported pivotally to the retainer at one of the opposite short sides, respectively, and are supported pivotally to a connecting rod at the other one of the opposite short sides, respectively. Thus, the horizontal fins are parallel to each other. Moreover, the horizontal fins are connected with a link mechanism by way of the connecting rod. Thus, it is possible to swing all of the horizontal pins synchronously in the up/down direction by actuating the link mechanism by way of the connecting rod.

However, in recent passenger vehicles, it is a desirable instrument-panel decoration that the cross-sectional configuration is drawn as a smooth curve. That is, it is preferred to employ instrument panels with such highly-thrusted decorations that their decorative surface descends smoothly from the windshield glass down to the vehicle passenger room. Consequently, it is necessary to change the shape of air-conditioning registers, which are disposed in such instrument panels.

Specifically, since an instrument panel used to have such a decoration that it is disposed substantially perpendicularly, the opening surface of an air-conditioning register used to be disposed perpendicularly with respect to a horizontal plane. However, the opening surface of an air-conditioning register has come to make an acute angle with respect to a horizontal plane recently. Moreover, it has been preferred conventionally and later on to expose a horizontal-fin assembly rather than a vertical-fin assembly within the outlet opening of an air-conditioning register. In addition, from the viewpoint of decorativeness, the horizontal-fin assembly has been disposed so that the constituent horizontal-fin members are arranged along the opening surface of the outlet opening, that is, in an inclined manner with respect to a horizontal plane.

However, in such a horizontal-fin assembly whose constituent horizontal-fin members are inclined at an acute angle with respect to a horizontal plane, the constituent horizontal-fin members 200 have overlapped to interfere with each other eventually when they are swung to direct the blowing-out air-conditioning air downward, as illustrated in FIG. 14. Accordingly, not only it is difficult to control the blowing-out air downward, but also there arises such a drawback that no air blows out because the constituent horizontal-fin members 200 have nearly shut up the opening 101 of the retainer 100. In such an instance, it is necessary to change the design of the horizontal-fin assembly. However, changing the design of the horizontal-fin assembly might necessitate not only the design change of an air-conditioning register but also the design change of an instrument panel. Consequently, a problem might occur in that the designing man-hour requirements have gone up considerably.

For example, Japanese Unexamined Patent Publication (KOKAI) No. 11-139,156 sets forth a problem that the lowermost constituent horizontal-fin member interferes with the inner bottom wall of the retainer so that it is difficult to control the blowing-out air upward. In order to solve this problem, the publication sets forth the following countermeasure. That is, among the holes, which are provided in the connecting rod in order to pivotally support the constituent horizontal-fin members, the lowermost holes are formed as an arc-shaped slot.

However, the problem pointed out in Japanese Unexamined Patent Publication (KOKAI) No. 11-139,156 occurs in air-conditioning registers whose opening surface is disposed substantially perpendicularly with respect to a horizontal plane. The problem is less likely to occur in air-conditioning registers whose opening surface is disposed at an acute angle with respect to a horizontal plane. Moreover, the problem, shown in FIG. 14, that it is difficult to control the blowing-out air downward results not from the interference between a retainer wall and a constituent fin member but from the interference between constituent fin members. Therefore, by simply applying the technique disclosed in Japanese Unexamined Patent Publication (KOKAI) No. 11-139,156, it is difficult to solve the problem, the limited downward directivity of blowing-out air-conditioning air, which results from the interference between constituent horizontal-fin members.

SUMMARY OF THE INVENTION

The present invention has been developed in view of the aforementioned circumstances. It is therefore an object of the present invention to provide an air-conditioning register in which the constituent horizontal-fin members of a horizontal-fin assembly are disposed to incline at an acute angle with respect to a horizontal plane, and in which the horizontal-fin members are inhibited from interfering with each other to make it possible to control the blowing-out air downward, thereby improving the downward directivity of blowing-out air-conditioning air.

A register for air conditioning according to the present invention can solve the aforementioned problems, and comprises:

a cylinder-shaped retainer having opposite upper and lower walls and opposite side walls, the opposite upper and lower walls and opposite side walls forming an outlet opening and an air passage;

a plurality of horizontal fins having a swing shaft, respectively, and disposed pivotally about the swing shaft within the retainer;

a connecting rod for connecting the horizontal fins;

actuating means for actuating the connecting rod to swing the horizontal fins synchronously with each other; and moving means for enabling the swing shaft of at least one of the horizontal fins to move back and forth with respect to the retainer depending on a swing angle of the horizontal fins with respect to a horizontal plane.

The present air-conditioning register can preferably further comprise: an action shaft extending from at lest one of the horizontal fins, wherein:

the moving means comprises:

a back-and-forth guide groove engaging with the swing shaft to guide the swing shaft back and forth; and an up-and-down guide groove engaging with the action shaft to guide the action shaft up and down.

In the present air-conditioning register, the opposite side walls of the retainer can preferably be provided with the moving means. Moreover, the connecting rod can desirably be provided with a rod groove for guiding the action shaft back and forth.

In addition, the air-conditioning retainer can desirably further have an inclining surface, which is disposed on the lower side of the air passage and inclines gently downward from small to large toward the outlet opening; and a lowermost horizontal fin, which is disposed the lowermost in the horizontal fins, has a surface, which is disposed substantially parallel to the inclining surface when the lowermost horizontal fin swings most downward.

If such is the case, the present air-conditioning register can desirably further comprise: a guide fin disposed rearwardly of the lowermost horizontal fin, wherein:

the guide fin has a trailing end, and a leading end, the trailing end supported pivotally to the opposite side walls of the retainer, the leading end supported pivotally to the lowermost horizontal fin; and the guide fin swings so as to incline upward when the lowermost horizontal fin swings to dispose the surface substantially parallel to the inclining surface of the retainer.

The present air-conditioning register comprises the moving means. The moving means enables the swing shaft of at least one of the horizontal fins to move back and forth depending on a swing angle of the horizontal fins with respect to a horizontal plane. Accordingly, when directing the blowing-out air-conditioning air downward, for instance, it is possible to move the swing shaft of at least one of the horizontal fins rearward away from the outlet opening of the retainer. Consequently, it is possible to dispose the constituent horizontal fins of a horizontal-fin assembly at an angle (e.g., designated at θ' in FIG. 3) with respect to a horizontal plane, which is greater than the inclination angle of the outlet opening's opening surface with respect to the horizontal plane (e.g., designated at θ in FIG. 3), that is, θ'>θ.

Therefore, even when the disposition angle of the constituent horizontal fins of a horizontal-fin assembly is an acute angle with respect to a horizontal plane, the present air-conditioning register can control the blowing direction of blowing-out air-conditioning air downward while inhibiting the constituent horizontal fins from interfering with each other. Accordingly, the present air-conditioning register exhibits upgraded downward directivity. Moreover, the advantage obviates the design change of horizontal-fin assembly and/or instrument panel. Consequently, the present air-conditioning register enables engineers to remarkably reduce the man-hour requirements for designing register and/or instrument panel.

Moreover, in the present air-conditioning register, when the retainer further has an inclining surface, which is disposed on the lower side of the air passage and inclines gently downward from small to large toward the outlet opening; and a lowermost horizontal fin, which is disposed the lowermost in the horizontal fins, has a surface, which is substantially parallel to the inclining surface when the lowermost horizontal fin swings most downward, not only the blowing-out air-conditioning air, which the lowermost horizontal fin guides, flows along the inclining surface, but also the Coanda effect is produced. As a result, the present air-conditioning register exhibits furthermore upgraded downward directivity.

In addition, when the present air-conditioning register further comprises a guide fin disposed rearwardly of the lowermost horizontal fin, wherein: the guide fin has a trailing end, and a leading end, the trailing end supported pivotally to the opposite side walls of the retainer, the leading end supported pivotally to the lowermost horizontal fin; and the guide fin swings so as to incline upward when the lowermost horizontal fin swings to dispose the surface substantially parallel to the inclining surface of the retainer, the lowermost horizontal fin furthermore guides the blowing-out air-conditioning air, which the guide fin has guided upward, downward again. Therefore, such an additional arrangement can inhibit the ventilation resistance from enlarging. Hence, the present air-conditioning register exhibits furthermore upgraded downward directivity.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
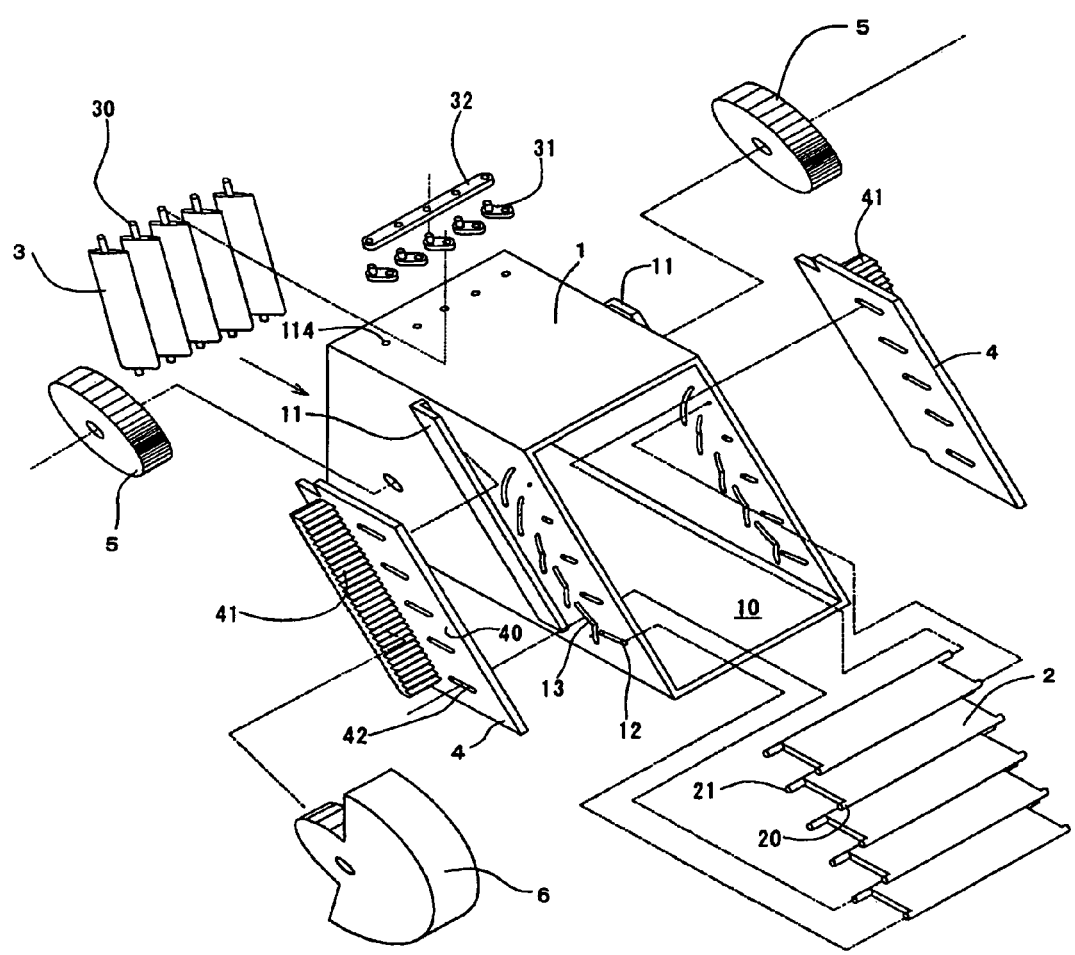
FIG. 1 is an exploded view for illustrating an air-conditioning register according to Example No. 1 of the present invention.

Having generally described the present invention, a further understanding can be obtained by reference to the specific preferred embodiments which are provided herein for the purpose of illustration only and not intended to limit the scope of the appended claims.

An air-conditioning register according to the present invention comprises a cylinder-shaped retainer, a plurality of horizontal fins, a connecting rod, and actuating means. The cylinder-shaped retainer has opposite upper and lower walls and opposite side walls, which form an outlet opening and an air passage. The horizontal fins have a swing shaft, respectively, and are disposed pivotally about the swing shaft within the retainer. The connecting rod connects the horizontal fins. The actuating means actuates the connecting rod to swing the horizontal fins synchronously with each other.

One of the major features of the present air-conditioning register is that the swing shaft of at least one of the horizontal fins is made movable back and forth. Specifically, the present air-conditioning register further comprises moving means for enabling the swing shaft of at least one of the horizontal fins to move back and forth with respect to the retainer depending on a swing angle of the horizontal fins with respect to a horizontal plane.

As for the moving means, it is possible to think of a link mechanism, which uses a rack-and-pinion. However, it is preferable that the present air-conditioning register can comprise an action shaft extending from at least one of the horizontal fins, wherein: the moving means can comprise: a back-and-forth guide groove engaging with the swing shaft to guide the swing shaft back and forth; and an up-and-down guide groove engaging with the action shaft to guide the action shaft up and down. Since such moving means comprises a less number of component parts, it is not only less expensive but also operates with high reliability.

Since the present air-conditioning register comprises the thus constructed moving means, it can swing the rear-side end of at least one of the horizontal fins about the swing shaft in the up/down direction, and can move the swing shaft of at least one of the horizontal fins backward away from the opening of the retainer, when the actuating means actuates the connecting rod to swing the horizontal fins synchronously with each other. Therefore, even when the outlet-opening surface makes an acute angle with respect to a horizontal plane, the present air-conditioning register can make the disposition angle of at least one of the constituent horizontal fins of the horizontal-fin assembly larger with respect to a horizontal plane than the acute inclination angle of the outlet-opening surface with respect thereto. As a result, the present air-conditioning register can not only inhibit the constituent horizontal fins from interfering with other, but also can exhibit enhanced downward directivity.

When the present air-conditioning register comprises the above-described moving means, it is advisable that at least one of the horizontal fins can be constructed so that the rear-side end of the horizontal fin swings about the swing shaft, which is disposed at the front-side end of the horizontal fin or the center of the shorter side thereof. Moreover, at least one of the horizontal fins can be constructed so that the front-side end of the horizontal fin swings about the swing shaft, which is disposed at the rear-side end of the horizontal fin or the center of the shorter side thereof.

Moreover, the opposite side walls of the retainer can be provided with the back-and-forth guide groove and up-down-guide groove. In addition, the present air-conditioning register can further comprise a sliding plate for pivotally supporting the swing shaft of at least one of the horizontal fins, wherein the sliding plate is provided with an up-and-down guide groove for guiding the action shaft up and down. In this instance, when the sliding plate slides back and forth, it is possible to move the swing shaft up and down.

Moreover, the connecting rod can desirably be provided with a rod groove for guiding the action shaft back and forth. When the present air-conditioning register comprises such a connecting rod, it can move the plural constituent horizontal fins back and forth as well as swing them up and down synchronously.

However, in the above-described present air-conditioning register, when the constituent horizontal fins of a horizontal-fin assembly swing downward, the lower the constituent horizontal fins are disposed by the more distance they are moved backward. Accordingly, when the surface of the lowermost constituent horizontal fin is extended imaginarily, it might come to cross the inner bottom surface of the retainer. That is, the blowing-out air-conditioning air, which the lowermost constituent horizontal fin guides, might collide with the inner bottom surface of the retainer. Consequently, the present air-conditioning register might suffer from a drawback in that it exhibits degraded downward directivity.

Hence, in the present air-conditioning register, the retainer can desirably have an inclining surface, which is disposed on the lower side of the air passage and inclines gently downward from small to large toward the outlet opening; and a lowermost horizontal fin, which is disposed the lowermost in the horizontal fins, has a surface, which is disposed substantially parallel to the inclining surface when the lowermost horizontal fin swings most downward. When the present air-conditioning register has such a retainer and a lowermost horizontal fin, it exhibits upgraded downward directivity because the blowing-out air-conditioning air, which the lowermost horizontal fin guides, flows along the inclining surface of the retainer. Furthermore, the present air-conditioning register demonstrates the Coanda effect as well. As a result, the present air-conditioning register exhibits furthermore improved downward directivity because the blowing-out air-conditioning air flows in a direction inclining downward greatly than the swing angle of the lowermost horizontal fin and the inclination angle of the inclining surface. Thus, the present air-conditioning register can send the blowing-out air-conditioning air toward the chest of a passenger around the thorax so that the passenger can enjoy improved amenity.

However, when the constituent horizontal fins of a horizontal-fin assembly swing to incline downward as described above, a sealed space might arise between the lowermost horizontal fin and the inner bottom surface of the retainer. The lowermost horizontal fin and the inner bottom surface of the retainer, which form such a sealed space, collide with the blowing-out air-conditioning air to enlarge the ventilation resistance. Moreover, such a sealed space might adversely affect the Coanda effect.

Hence, the present air-conditioning register can desirably further comprise a guide fin, wherein: the guide fin has a trailing end, and a leading end, the trailing end supported pivotally to the opposite side walls of the retainer, the leading end supported pivotally to the lowermost horizontal fin; and the guide fin swings so as to incline upward when the lowermost horizontal fin swings to dispose the surface substantially parallel to the inclining surface of the retainer. In the thus constructed present air-conditioning register, the lowermost horizontal fin guides the blowing-out air-conditioning air, which the guide fin has guided upward, downward again. Therefore, the present air-conditioning register can inhibit the ventilation resistance from enlarging, and additionally can send the blowing-out air-conditioning air, which is sent downward by means of the Coanda effect, in an increased flow volume.

EXAMPLES

The present air-conditioning register will be hereinafter described in detail with reference to specific examples. Note that, in the following descriptions, the outlet-opening side of a retainer will be referred to as the "front" side and the inward side of the retainer will be referred to as the "rear" side.

Example No. 1

FIG. 1 is an exploded perspective view, which shows an air-conditioning register according to Example No. 1 of the present invention. As illustrated in the drawing, the air-conditioning register comprises a cylinder-shaped retainer 1, a plurality of horizontal fins 2, a plurality of vertical fins 3, and horizontal-fins connecting rods 4. The retainer 1 is fixed to an instrument panel. The horizontal fins 2 are held pivotally adjacent to an outlet opening 10 of the retainer 1. The vertical fins 3 are disposed more rearward with respect to the horizontal fins 2, and are held pivotally within the retainer 1. The horizontal-fins connecting rods 4 connect the horizontal fins 2 with each other.

The retainer 1 is formed as a squared-cylinder shape. The retainer 1 has the outlet opening 10, which is inclined at an angle of about 40 degrees with respect to a horizontal plane, so that the retainer 1 exhibits a highly-thrusted decoration. Moreover, the outer surfaces of the right and left side walls of the retainer 1 are provided with rails 11, respectively. The rails 11 are disposed parallel to the surface of the outlet opening 10, that is, the rails 11 are inclined at an angle of about 40 degrees with respect to a horizontal plane to extend downward. In addition, the rails 11 hold the horizontal-fins connecting rods 4 slidably so that the horizontal-fins connecting rods 4 move slidably within the rails 11.

Moreover, the right and left side walls of the retainer 1 are provided with back-and-forth guide grooves 12 and up-and-down guide grooves 13, respectively. The back-and-forth guide grooves 12 extend horizontally. The up-and-down guide grooves 13 are disposed rearwardly of the back-and-forth guide grooves 12, respectively, and are formed in a worm-eaten manner. The back-and-forth guide grooves 12 and up-and-down guide grooves 13 are formed in the same quantity as the number of the horizontal fins 2, respectively. Note that the lower the back-and-forth guide grooves 12 are disposed, the longer they are formed; but the uppermost back-and-forth guide grooves 12 are formed as a circular hole.

The side surfaces (or short sides) of the horizontal fins 2 are provided with a front-end boss 20 and a rear-end boss 21 at the opposite ends, respectively. The front-end bosses 20 and rear-end bosses 21 are formed to protrude from the side surfaces of the horizontal fins 2, and the rear-end bosses 21 are formed longer than the front-end bosses 20 are formed. The front-end bosses 20 are supported pivotally to the back-and-forth guide grooves 12, respectively. On the other hand, the rear-end bosses 21 penetrate through the up-and-down guide grooves 13, respectively. Moreover, the rear-end bosses 21 move within the up-and-down guide grooves 13 as the horizontal fins 2 swing up and down and move back and forth. Specifically, the horizontal fins 2 are disposed pivotally up and down about the front-end bosses 20, respectively, and are disposed movably back and forth along the back-and-forth guide grooves 12, respectively.

The side surfaces (or short sides) of the vertical fins 3 are provided with a shaft 30, respectively. The shafts 30 are formed to protrude from the side surfaces of the vertical fins 3. The shafts 30 are supported pivotally to shaft holes 114, which are formed in the top and bottom walls of the retainer 1, respectively. The shafts 30, which protrude upward, are disposed to penetrate through the shaft holes 114, and are fastened to one of the opposite ends of arms 31, which are disposed on the upper side of the retainer 1, respectively. Each of the other one of the opposite ends of the arms 31 is supported pivotally to a vertical-fins connecting rod 32. The vertical-fins connecting rod 32 engages with a not-shown horizontal knob.

Therefore, when swinging the not-shown horizontal knob in the clockwise or counterclockwise direction, the vertical-fins connecting rod 32 moves in the right/left direction. As the vertical-fins connecting rod 32 thus moves, all of the vertical fins 3 swing in the right/left direction synchronously. Thus, it is possible to control the flow of air-conditioning air, which blows out of the outlet opening 10 of the retainer 1, in the right/left direction freely.

As illustrated in FIG. 1, the horizontal-fins connecting rods 4 comprise a plate-shaped portion 40, and a rack portion 41, respectively. The plate-shaped portion 40 is disposed slidably within one of the rails 11. The rack portion 41 protrudes from the plate-shaped portion 40 substantially perpendicularly, and extends parallel to the inclination direction of the outlet opening 10 of the retainer 1. The plate-shaped portion 40 is provided with rod grooves 42, which extend horizontally. The rod grooves 42 are formed in the same quantity as the number of the horizontal fins 2. Moreover, the rear-end bosses 21 of the horizontal fins 2, which penetrate through the up-and-down guide grooves 13 to project therefrom, are fitted into the rod grooves 42, respectively. In addition, the rack portion 41 is provided with rack teeth on both of the front and rear surfaces, respectively.

As illustrated in FIG. 1, the retainer 1 is provided with paired pinion gears 5. The paired pinion gears 5 are connected with each other pivotally by a not-shown shaft so that they can rotate synchronously. The paired pinion gears 5 mesh with the rear-side rack teeth of the rack portions 41 of the right and left horizontal-fins connecting rods 4. Moreover, knob 6 meshes with the front-side rack teeth of one of the horizontal-fins connecting rods 4's rack portion 41. Note that the knob 6 is supported pivotally to a not-shown flange, which extends outward from the retainer 1. When rotating the knob 6, one of the horizontal-fins connecting rods 4 slides up and down within one of the rails 11 to rotate the paired pinion gears 5. Then, the pinion gears 5 rotate to slide the other one of the horizontal-fins connecting rods 4 up and down within the other one of the rails 11 synchronously.

Figure 4:
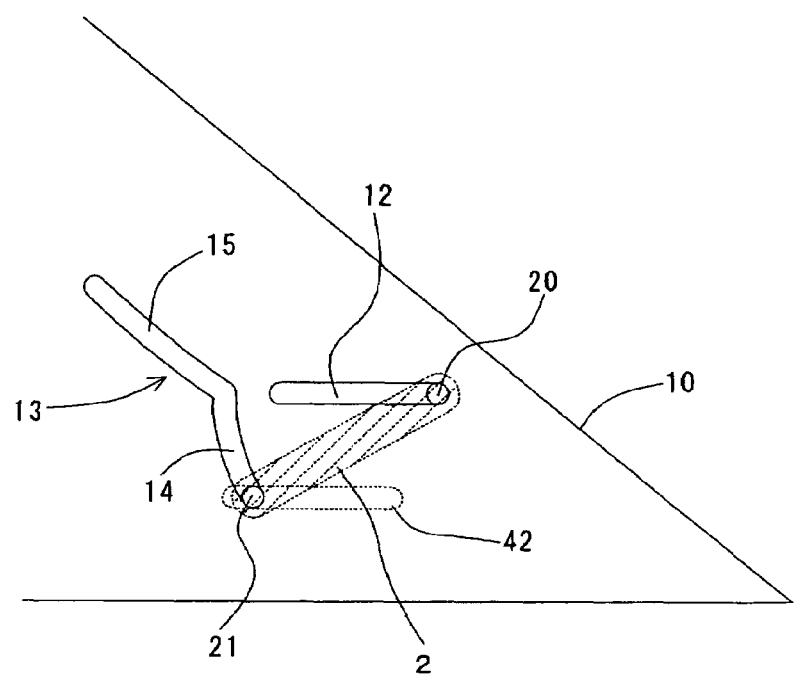
FIG. 4 is an enlarged see-through side view for illustrating a major portion of the air-conditioning register according to Example No. 1 of the present invention when the horizontal fins swing upward.

Except the uppermost up-and-down guide groove 13, the up-and-down guide grooves 13 of the retainer 1 comprise an arc portion 14, and a trailing portion 15, respectively, as illustrated in FIG. 4, for instance. The arc portion 14 is formed as an arc shape whose center is placed at one of the opposite ends of the back-and-forth guide grooves 12. Specifically, the trailing portion 15 is disposed to continue from the arc portion 14. The trailing portion 15 is formed as a locus shape, which the rear-end bosses 21 of the horizontal fins 2 draw when the front-end bosses 20 move within the back-and-forth guide grooves 12 of the retainer 1 so that the rear-end bosses 21 move gradually upward from the horizontal positions. As illustrated in FIG. 1, the uppermost up-and-down guide groove 13 comprises the arc portion 14 alone, whose center coincides with the uppermost back-and-forth guide groove 12, which is formed as a circular hole.

Figure 2:
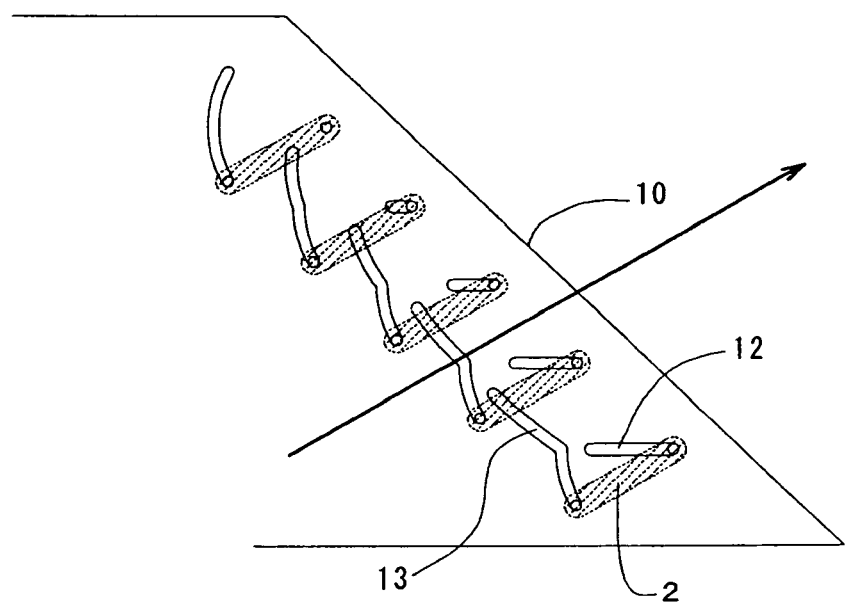
FIG. 2 is a see-through side view for illustrating the air-conditioning register according to Example No. 1 of the present invention when the horizontal fins swing upward.

The thus constructed air-conditioning register according to Example No. 1 of the present invention operates as hereinafter described. First of all, when directing the flow of blowing-out air-conditioning air upward, the front-end bosses 20 of the horizontal fins 2 are positioned at the front ends of the back-and-forth guide grooves 12; and the rear-end bosses 21 are positioned at the bottom ends of the arc portions 14 of the up-and-down guide grooves 13, as shown in FIG. 2 and FIG. 4. Therefore, the horizontal fins 2 are disposed upward by about 30 degrees with respect to a horizontal plane, so that the air-conditioning air blows out of the outlet opening 10 of the retainer 1 upward obliquely.

Figure 5:
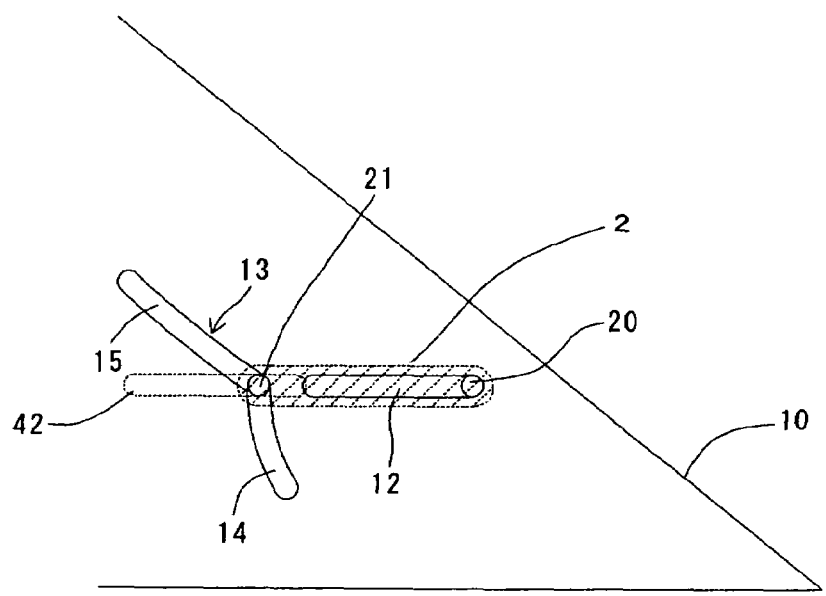
FIG. 5 is an enlarged see-through side view for illustrating a major portion of the air-conditioning register according to Example No. 1 of the present invention when the horizontal fins are disposed horizontally.

When rotating the knob 6 downward in order to change the blowing direction of blowing-out air-conditioning air, the rack portions 41 of the horizontal-fins connecting rods 4 are actuated so that the right and left horizontal-fins connecting rods 4 move upward while being guided by the right and left rails 11. As the horizontal-fins connecting rods 4 thus move, the rear-end bosses 21 of the respective horizontal fins 2 move within the rod grooves 42, and at the same time swing about the front ends of the back-and-forth guide grooves 12 to go upward within the arc portions 14 of the up-and-down guide grooves 13. Accordingly, the horizontal fins 2 take the horizontal positions, respectively, as shown in FIG. 5.

Figure 6:
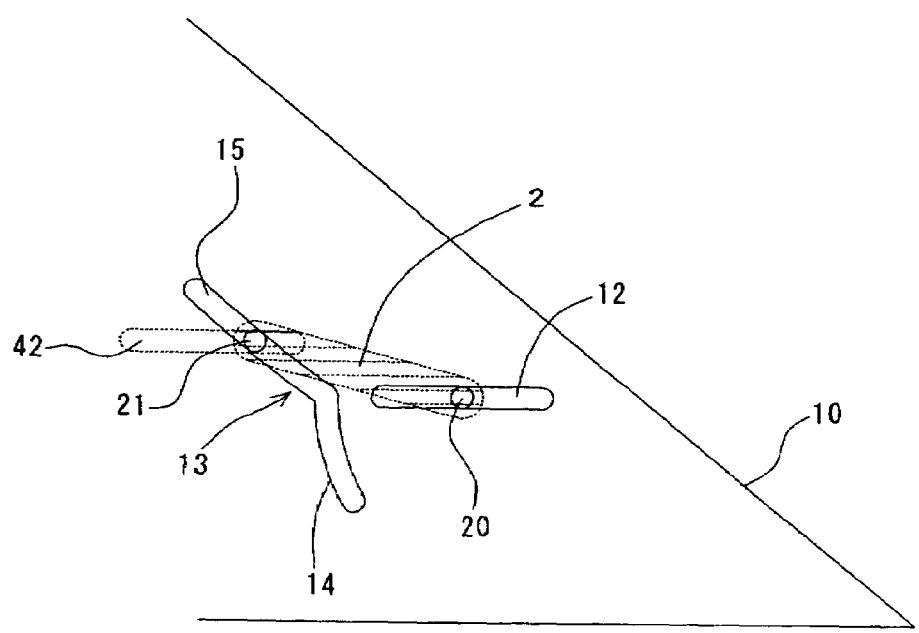
FIG. 6 is an enlarged see-through side view for illustrating a major portion of the air-conditioning register according to Example No. 1 of the present invention when the horizontal fins swing downward.

When rotating the knob 6 further downward, the rear-end bosses 21 of the respective horizontal fins 2 moves further forward within the rod grooves 42. As the rear-end bosses 21 thus move, the front-end bosses 20 of the respective horizontal fins 2, excepting the uppermost horizontal fin 2, move rearward within the back-and-forth guide grooves 12, and at the same time the rear-end bosses 21 move upward within the trailing portions 15 of the up-and-down guide grooves 13. Accordingly, the respective horizontal fins 2, excepting the uppermost horizontal fin 2, are put in the state shown in FIG. 3 or FIG. 7 by way of the state shown in FIG. 6. However, in the uppermost horizontal fin 2 alone, note that the front-end bosses 20 do not move back and forth; and the rear-end bosses 21 move within the arc portions 14 only.

Figure 3:
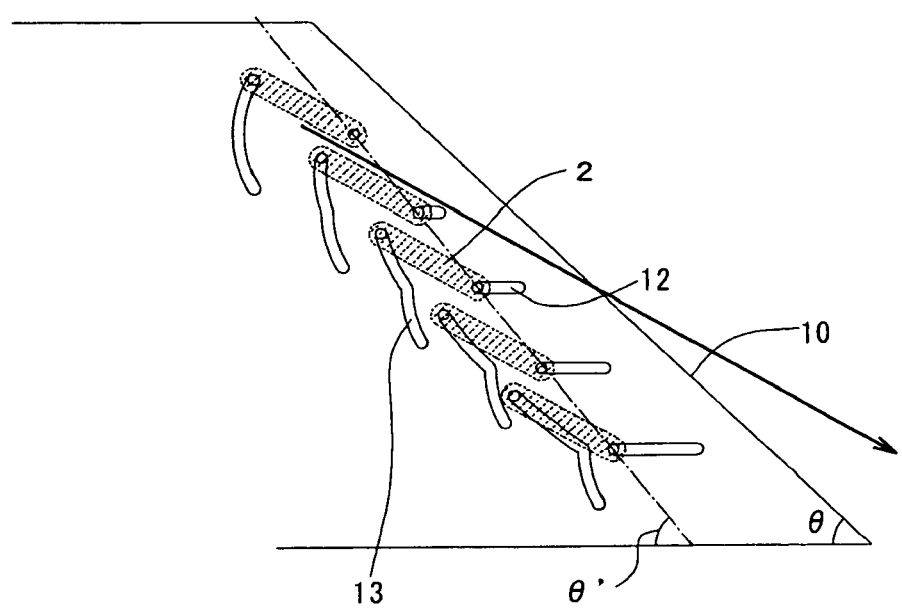
FIG. 3 is a see-through side view for illustrating the air-conditioning register according to Example No. 1 of the present invention when the horizontal fins swing downward.
Figure 7:
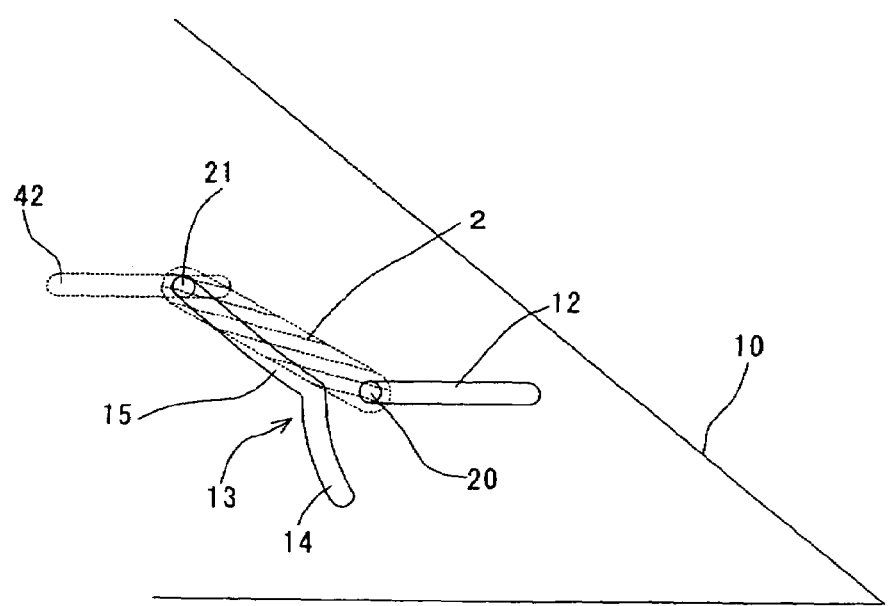
FIG. 7 is an enlarged see-through side view for illustrating a major portion of the air-conditioning register according to Example No. 1 of the present invention when the horizontal fins swing downward.

When the air-conditioning register according to Example No. 1 of the present invention is put in the state shown in FIG. 3 or FIG. 7, the respective horizontal fins 2 incline downward by about 30 degrees with respect to a horizontal plane and the front ends of the horizontal fins 2, excepting that of the uppermost horizontal fin 2, have moved rearward with respect to the outlet opening 10 of the retainer 1. Additionally, the lower the horizontal fins 2 are disposed, the more distance the front-end bosses 20 of the horizontal fins 2 move rearward. Specifically, as illustrated in FIG. 3, the horizontal fins 2 are disposed at a greater disposition angle θ' with respect to a horizontal plane than the inclination angle θ of the outlet opening 10 of the retainer 1 with respect to the horizontal plane so as to ease their highly thrusted dispositions. Therefore, the horizontal fins 2 do not interfere with each other so that spaces are formed between the horizontal fins 2. Accordingly, the blowing-out air-conditioning air flows out of the outlet opening 10 downward. Consequently, the air-conditioning register according to Example No. 1 exhibits good downward directivity of blowing-out air-conditioning air securely.

Example No. 2

However, when the above-described air-conditioning register according to Example No. 1 of the present invention blows out air-conditioning air downward as shown in FIG. 3 or FIG. 7, there might possibly arise a problem in that the air-conditioning air, which the lowermost horizontal fin 22 guides, might collide with the inner bottom wall of the retainer 1 to impair the downward directivity.

Figure 8:
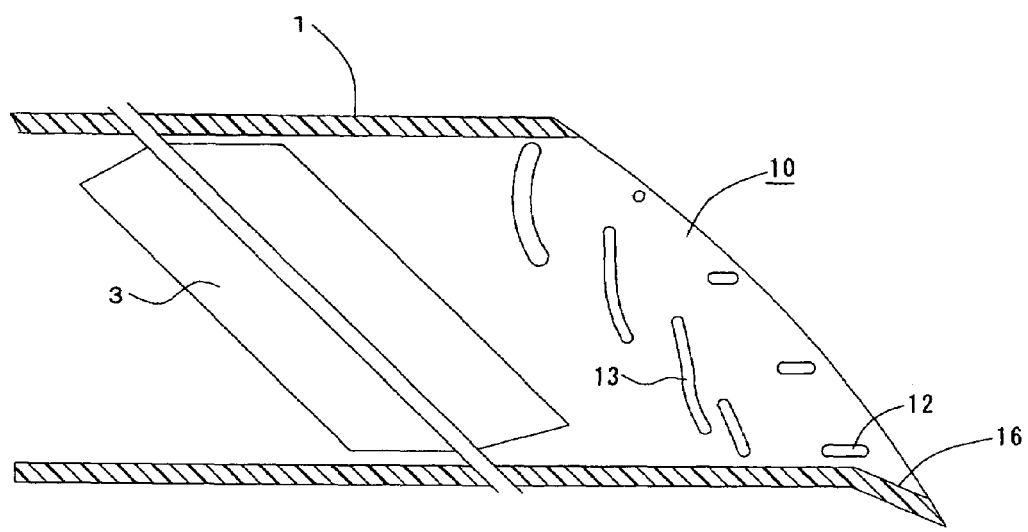
FIG. 8 is a cross-sectional view for illustrating the retainer, from which the horizontal-fin assembly is removed, in an air-conditioning register according to Example No. 2 of the present invention.

An air-conditioning register according to Example No. 2 of the present invention can solve the possible problem. As illustrated in FIG. 8, the air-conditioning register according to Example No. 2 further comprises an inclining surface 16. The inclining surface 16 is disposed on the lower side of the air passage, and inclines gently downward from small to large toward the outlet opening 10 of the retainer 1. The other arrangements of the air-conditioning register according to Example No. 2 are the same as those of Example No. 1 virtually. Therefore, parts, which are constructed in the same manner as those of Example No. 1, will not be described herein, but parts, which are constructed differently from those of Example No. 1, will be hereinafter described in detail.

Figure 9:
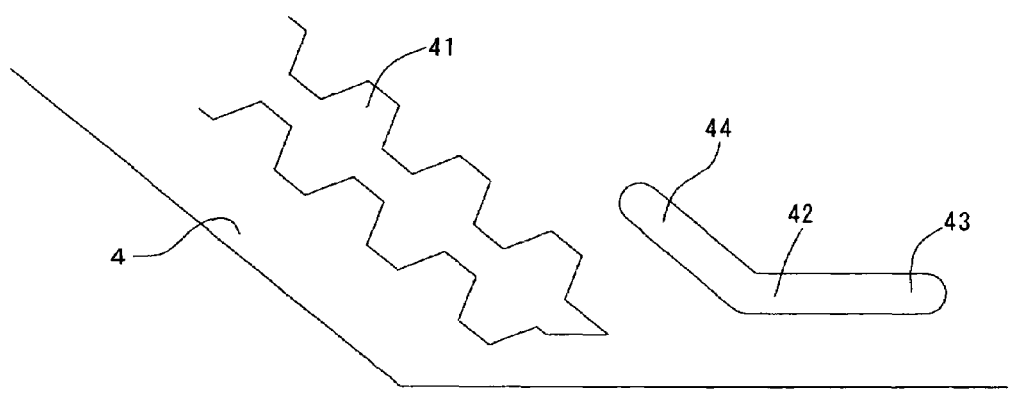
FIG. 9 is an enlarged see-through side view for illustrating a major portion of the connecting rod used in the air-conditioning register according to Example No. 2 of the present invention.
Figure 10:
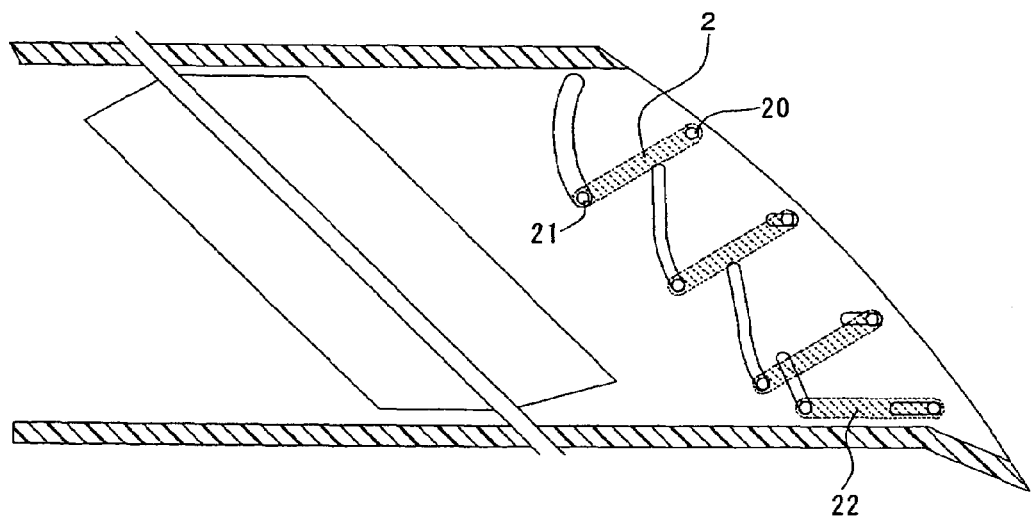
FIG. 10 is a cross-sectional view for illustrating the air-conditioning register according to Example No. 2 of the present invention when the horizontal fins swing upward.

As illustrated in FIG. 9, the lowermost rod groove 42 of the horizontal-fins connecting rods 4 comprises a horizontal portion 43, and an inclining portion 44, respectively. The inclining portion 44 is connected to the rear end of the horizontal portion 43, and extends upward parallel to the rack portion 41. Specifically, when rotating the knob 6 upward in order to direct the flow of air-conditioning air upward, the rear-end bosses 21 of the lowermost horizontal fin 22 engage with the inclining portions 44. Therefore, as illustrated in FIG. 10, the lowermost horizontal fin 22 hardly swings, and maintains the horizontally disposed state; but the other horizontal fins 2 swing to fulfill the upward directivity of the air-conditioning register according to Example No. 2 of the present invention.

Figure 11:
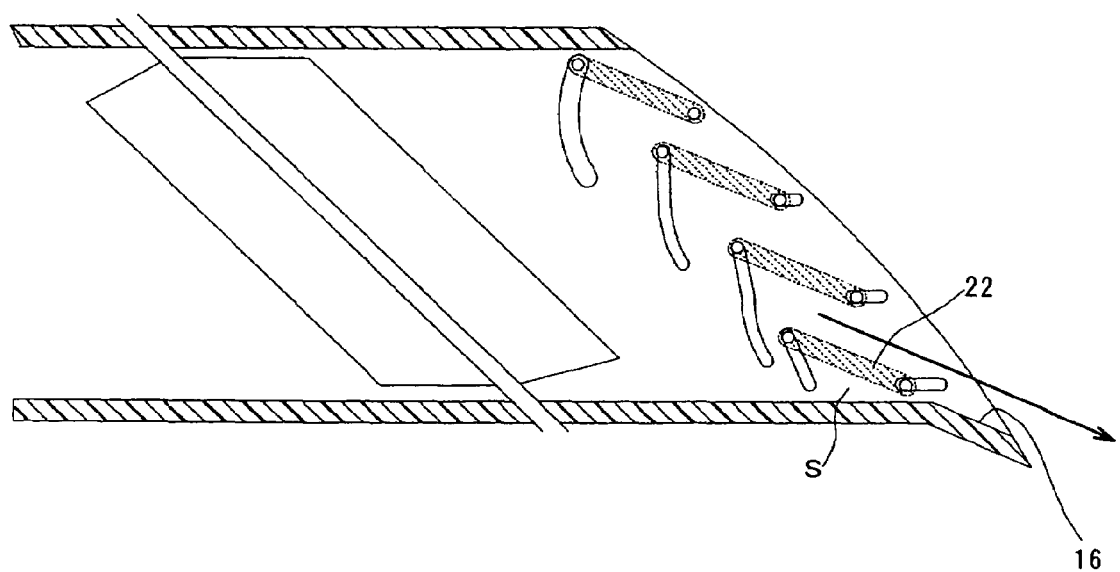
FIG. 11 is a cross-sectional view for illustrating the air-conditioning register according to Example No. 2 of the present invention when the horizontal fins swing downward.

On the other hand, when the air-conditioning register according to Example No. 2 of the present invention sends the air-conditioning air downward, all of the horizontal fins 2 swing downward about the front-end bosses 20 so that the rear-end bosses 21 swing upward. In this instance, as illustrated in FIG. 11, the top surface of the lowermost horizontal fin 22 is disposed parallel to the inclining surface 16. Specifically, the air-conditioning air, which the lowermost horizontal fin 22 guides, blows out along the inclining surface 16 without ever colliding with the inner bottom wall of the retainer 1. Moreover, the blowing-out air-conditioning air, which flows along the inclining surface 16, tries to go further downward by means of the Coanda effect. Therefore, the air-conditioning register according to Example No. 2 exhibits better downward directivity than the air-conditioning register according to Example No. 1 does.

Example No. 3

However, when the air-conditioning register according to Example No. 2 of the present invention blows out the air-conditioning air downward as shown in FIG. 11, a cross-sectional triangular space "S" arises between the lowermost horizontal fin 22 and the inner bottom wall of the retainer 1. The air-conditioning air, which goes into the space "S," exhibits a low rate of contribution to air conditioning, because the space "S" has a narrow exit. Moreover, the space "S" not only enlarges the ventilation resistance of the air-conditioning register according to Example No. 2, but also adversely affects the Coanda effect.

Figure 12:
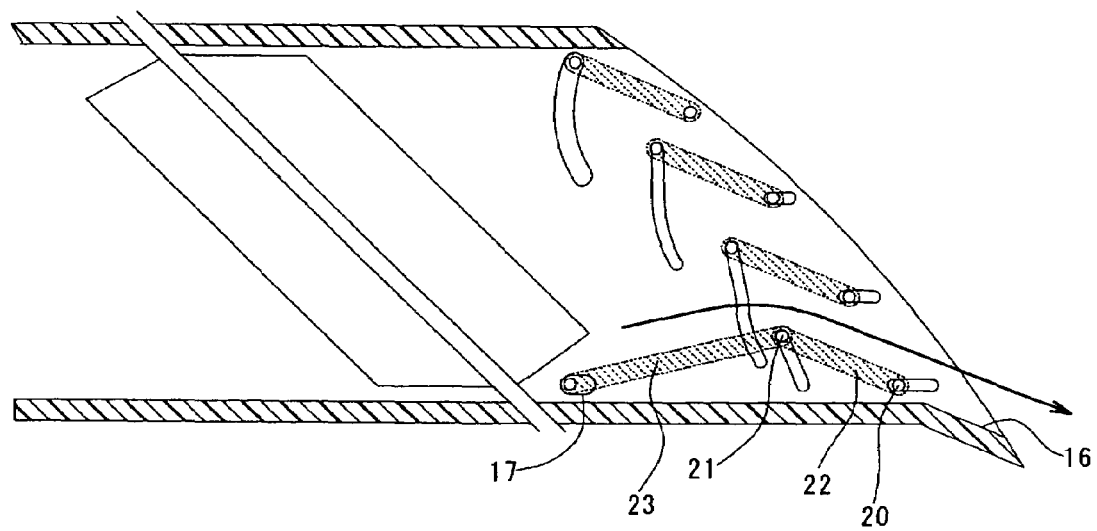
FIG. 12 is a cross-sectional view for illustrating an air-conditioning register according to Example No. 3 of the present invention when the horizontal fins swing downward.

Therefore, an air-conditioning register according to Example No. 3 of the present invention further comprises a guide fin 23, which is disposed rearwardly of the lowermost horizontal fin 22, as illustrated in FIG. 12. Excepting the guide fin 23, the air-conditioning register according to Example No. 3 is arranged in the same manner as the air-conditioning registers according to Example Nos. 1 and 2. The front end of the guide fin 23 is supported pivotally to the rear-end bosses 21 of the lowermost horizontal fin 22, and the rear end of the guide fin 23 is supported to slots 17, which the retainer 1 is provided with.

When the air-conditioning register according to Example No. 3 of the present invention blows out the air-conditioning air downward as shown in FIG. 12, the guide fin 23 is inclined upward slopingly with respect to a horizontal plane, and is connected to the lowermost horizontal fin 22 continuously. Specifically, the air-conditioning air first flows upward along the guide fin 23, and then flows downward along the lowermost horizontal fin 22. Therefore, the guide fin 23 inhibits the air-conditioning air from going into the cross-sectionally triangular space "S," and accordingly prevents the ventilation resistance of the air-conditioning register according to Example No. 3 from increasing. Moreover, in the air-conditioning register according to Example No. 3, the flow volume and velocity of the air-conditioning air, which blows out along the inclining surface 16, are greater than those in the air-conditioning register according to Example No. 2. As a result, the air-conditioning register according to Example No. 3 exhibits much more upgraded downward directivity to offer passengers improved amenity.

Figure 13:
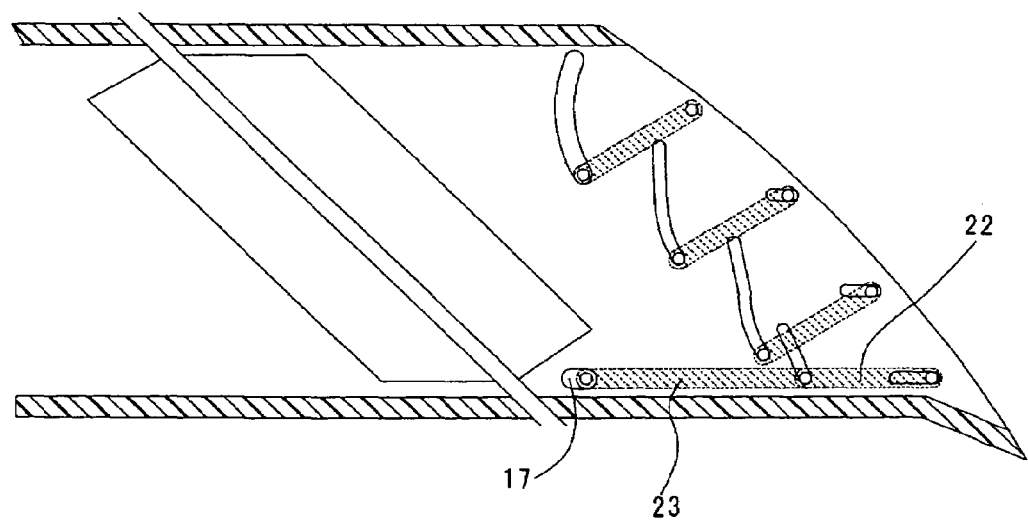
FIG. 13 is a cross-sectional view for illustrating the air-conditioning register according to Example No. 3 of the present invention when the horizontal fins swing upward.
Figure 14:
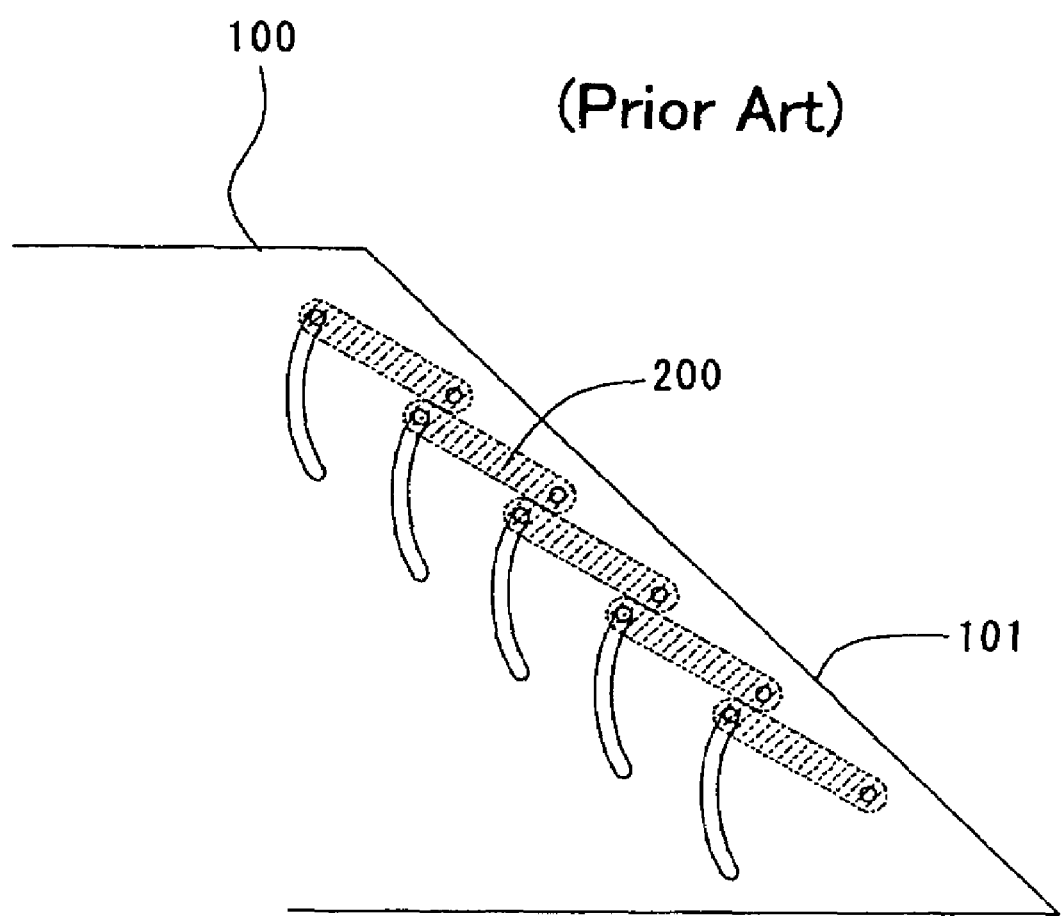
FIG. 14 is a see-through side view for illustrating a conventional air-conditioning register when the horizontal fins swing downward.

Note that, when the horizontal fins 2 are put in the horizontally disposed states, or upward blowing-out states, the rear end of the guide fin 23 moves forward within the slots 17. As a result, the guide fin 23 is disposed horizontally in the same manner as the lowermost horizontal fin 22, as illustrated in FIG. 13.

Having now fully described the present invention, it will be apparent to one of ordinary skill in the art that many changes and modifications can be made thereto without departing from the spirit or scope of the present invention as set forth herein including the appended claims.

What is claimed is:

1. A register for air conditioning, comprising:
   a tubular retainer having opposite upper and lower walls and opposite side walls, the opposite upper and lower walls and opposite side walls forming an outlet opening and an air passage, wherein an opening surface of the outlet opening makes an acute angle with respect to a horizontal plane;
   a plurality of horizontal fins having a swing shaft, respectively, and disposed pivotally about the swing shaft within the retainer and arranged and spaced apart along the opening surface;
   a connecting rod for connecting the horizontal fins;
   an actuator for actuating the connecting rod to swing the horizontal fins synchronously with each other; and
   a movement structure for enabling the swing shaft of at least one of the horizontal fins to move back and forth with respect to the retainer depending on a swing angle of the horizontal fins with respect to a horizontal plane, wherein:
   the swing shaft of the at least one horizontal fin is moved back and forth by a horizontal back-and-forth distance,
   the horizontal back-and-forth distance varies according to a vertical distance between a bottom of the retainer and the at least one horizontal fin,
   the closer the at least one horizontal fin is to the bottom of the retainer, the greater the horizontal back-and-forth distance is.

2. The register set forth in claim 1 further comprising an action shaft extending from said at least one of the horizontal fins, wherein:
   the movement structure comprises:
   a back-and-forth guide groove engaging with the swing shaft to guide the swing shaft back and forth; and
   an up-and-down guide groove engaging with the action shaft to guide the action shaft up and down.

3. The register set forth in claim 2, wherein the opposite side walls of the retainer are provided with the movement structure.

4. The register set forth in claim 2, wherein the connecting rod is provided with a rod groove for guiding the action shaft back and forth.

5. The register set forth in claim 2, wherein:
   the retainer further has an inclining surface, which is disposed on the lower side of the air passage and inclines gently downward from small to large toward the outlet opening; and
   a lowermost horizontal fin, which is disposed the lowermost in the horizontal fins, has a surface, which is disposed substantially parallel to the inclining surface when the lowermost horizontal fin swings most downward.

6. The register set forth in claim 5 further comprising a guide fin disposed rearward of the lowermost horizontal fin, wherein:
   the guide fin has a trailing end, and a leading end, the trailing end supported pivotally to the opposite side walls of the retainer, the leading end supported pivotally to the lowermost horizontal fin; and
   the guide fin swings so as to incline upwardly when the lowermost horizontal fin swings to dispose the surface substantially parallel to the inclining surface of the retainer.

7. The register set forth in claim 2, wherein the up-and-down guide groove comprises:
   an arc portion which is formed as an arc shape whose center is placed at one of the opposite ends of the back-and-forth guide groove; and
   a trailing portion, which is disposed to continue from the arc portion, and which is formed as a locus shape, the locus shape being drawn by the action shaft when the swing shaft of the one of the horizontal fins moves within the back-and-forth guide groove, thereby moving at least one of the horizontal fins, which is disposed horizontally, gradually upward about the swing shaft.

* * * * *